United States Patent
Ryu et al.

(10) Patent No.: US 8,416,201 B2
(45) Date of Patent: Apr. 9, 2013

(54) MOBILE TERMINAL AND METHOD OF CONTROLLING OPERATION OF THE MOBILE TERMINAL

(75) Inventors: Hye Jin Ryu, Seoul (KR); Moon Ju Kim, Seoul (KR); Jin Woo Chung, Seoul (KR); Dong Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1021 days.

(21) Appl. No.: 12/350,470

(22) Filed: Jan. 8, 2009

(65) Prior Publication Data
US 2009/0174684 A1 Jul. 9, 2009

(30) Foreign Application Priority Data
Jan. 9, 2008 (KR) .................. 10-2008-0002705

(51) Int. Cl.
*G06F 3/041* (2006.01)
(52) U.S. Cl. ........ 345/173; 715/702; 715/838; 715/842; 715/863
(58) Field of Classification Search .................. None
See application file for complete search history.

(56) References Cited

U.S. PATENT DOCUMENTS

| | | | | |
|---|---|---|---|---|
| 6,002,402 A * | 12/1999 | Schacher | .................. | 715/810 |
| 6,590,568 B1 * | 7/2003 | Astala et al. | .................. | 345/173 |
| 7,185,290 B2 * | 2/2007 | Cadiz et al. | .................. | 715/838 |
| 7,610,563 B2 * | 10/2009 | Nelson et al. | .................. | 715/839 |
| 7,663,607 B2 * | 2/2010 | Hotelling et al. | .................. | 345/173 |
| 7,924,271 B2 * | 4/2011 | Christie et al. | .................. | 345/173 |
| 7,954,064 B2 * | 5/2011 | Forstall et al. | .................. | 715/779 |
| 2003/0030673 A1 * | 2/2003 | Ho | .................. | 345/779 |
| 2004/0021643 A1 * | 2/2004 | Hoshino et al. | .................. | 345/173 |
| 2005/0289476 A1 * | 12/2005 | Tokkonen | .................. | 715/769 |
| 2006/0026521 A1 * | 2/2006 | Hotelling et al. | .................. | 715/702 |
| 2006/0173803 A1 * | 8/2006 | Morris | .................. | 707/1 |
| 2007/0157089 A1 * | 7/2007 | Van Os et al. | .................. | 715/702 |
| 2008/0034314 A1 * | 2/2008 | Louch et al. | .................. | 715/778 |
| 2008/0122796 A1 * | 5/2008 | Jobs et al. | .................. | 345/173 |
| 2008/0313568 A1 * | 12/2008 | Park et al. | .................. | 715/835 |
| 2009/0061837 A1 * | 3/2009 | Chaudhri et al. | .................. | 455/418 |
| 2009/0064055 A1 * | 3/2009 | Chaudhri et al. | .................. | 715/863 |
| 2009/0164942 A1 * | 6/2009 | Laaksonen et al. | .................. | 715/810 |
| 2009/0307631 A1 * | 12/2009 | Kim et al. | .................. | 715/830 |

* cited by examiner

*Primary Examiner* — Dismery Mercedes
(74) *Attorney, Agent, or Firm* — KED & Associates, LLP

(57) ABSTRACT

A mobile terminal and a method of controlling the operation of the mobile terminal are provided. The method includes displaying a first image on a touch screen; and if a multi-touch input is detected from the first image and then a drag input for dragging the first image is detected, displaying the first image as being torn from one side of the touch screen and storing the first image. Therefore, it is possible to easily store an image displayed on the touch screen in response to a multi-touch input and thus to effectively use the image for various purposes.

11 Claims, 9 Drawing Sheets

MOBILE TERMINAL AND METHOD OF CONTROLLING OPERATION OF THE MOBILE TERMINAL

CROSS-REFERENCE TO RELATED APPLICATION

This application claims priority from Korean Patent Application No. 10-2008-0002705 filed on Jan. 9, 2008 in the Korean Intellectual Property Office, the disclosure of which is incorporated herein by reference in its entirety.

BACKGROUND OF THE INVENTION

1. Field of the Invention

The present invention relates to a mobile terminal and a method of controlling the operation of the mobile terminal, and more particularly, to a mobile terminal which can store, in response to a multi-touch input, an image displayed on a touch screen and can thus use the stored image later for various purposes and a method of controlling the operation of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality. In particular, double-sided LCDs and full touch screens have both attracted public attention lately for the following reasons: double-sided LCDs can contribute to the miniaturization of mobile terminals while guaranteeing variety in the design of mobile terminals; and full touch screens can make keypads, one of the basic elements of existing mobile terminals, unnecessary.

However, there is a restriction in allocating sufficient space for a UI (such as a display device or a keypad) of a mobile terminal without compromising the mobility and the portability of a mobile terminal. Even the full touch screens of mobile terminals may not be able to provide sufficient space for displaying various UIs. Therefore, it is necessary to develop ways to effectively control the operation of mobile terminals and thus to provide efficient touch screen-based input/output functions.

SUMMARY OF THE INVENTION

The present invention provides a mobile terminal which can easily store, in response to a multi-touch input to a touch screen, an image displayed on the touch screen and a method of controlling the operation of the mobile terminal.

According to an aspect of the present invention, there is provided a method of controlling the operation of a mobile terminal, the method including displaying a first image on a touch screen; and if a multi-touch input is detected from the first image and then a drag input for dragging the first image is detected, displaying the first image as being torn from one side of the touch screen and storing the first image.

According to an aspect of the present invention, there is provided a method of controlling the operation of a mobile terminal, the method including displaying an image on a touch screen; and if a touch input which is touched by a larger part of the image than a reference area is detected and then a drag input for dragging the image is detected, displaying the image as being torn from one side of the touch screen in the predetermined direction and storing the image.

According to another aspect of the present invention, there is provided a mobile terminal including a touch screen configured to display a first image; and a controller configured to display the first image as being torn from one side of the touch screen and store the first image, if a multi-touch input is detected from the first image and then a drag input for dragging the first image is detected.

According to another aspect of the present invention, there is provided a mobile terminal including a touch screen configured to display an image; and a controller configured to display the image as being torn from one side of the touch screen in a predetermined direction and store the image, if a touch input which is touched by a larger part of the image than a reference area is detected and then a drag input for dragging the image is detected.

According to another aspect of the present invention, there is provided a computer-readable recording medium having recorded thereon a computer program for executing a method of controlling the operation of a mobile terminal, the method including displaying a first image on a touch screen; and if a multi-touch input is detected from the first image and then a drag input for dragging the first image is detected, displaying the first image as being torn from one side of the touch screen and storing the first image.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
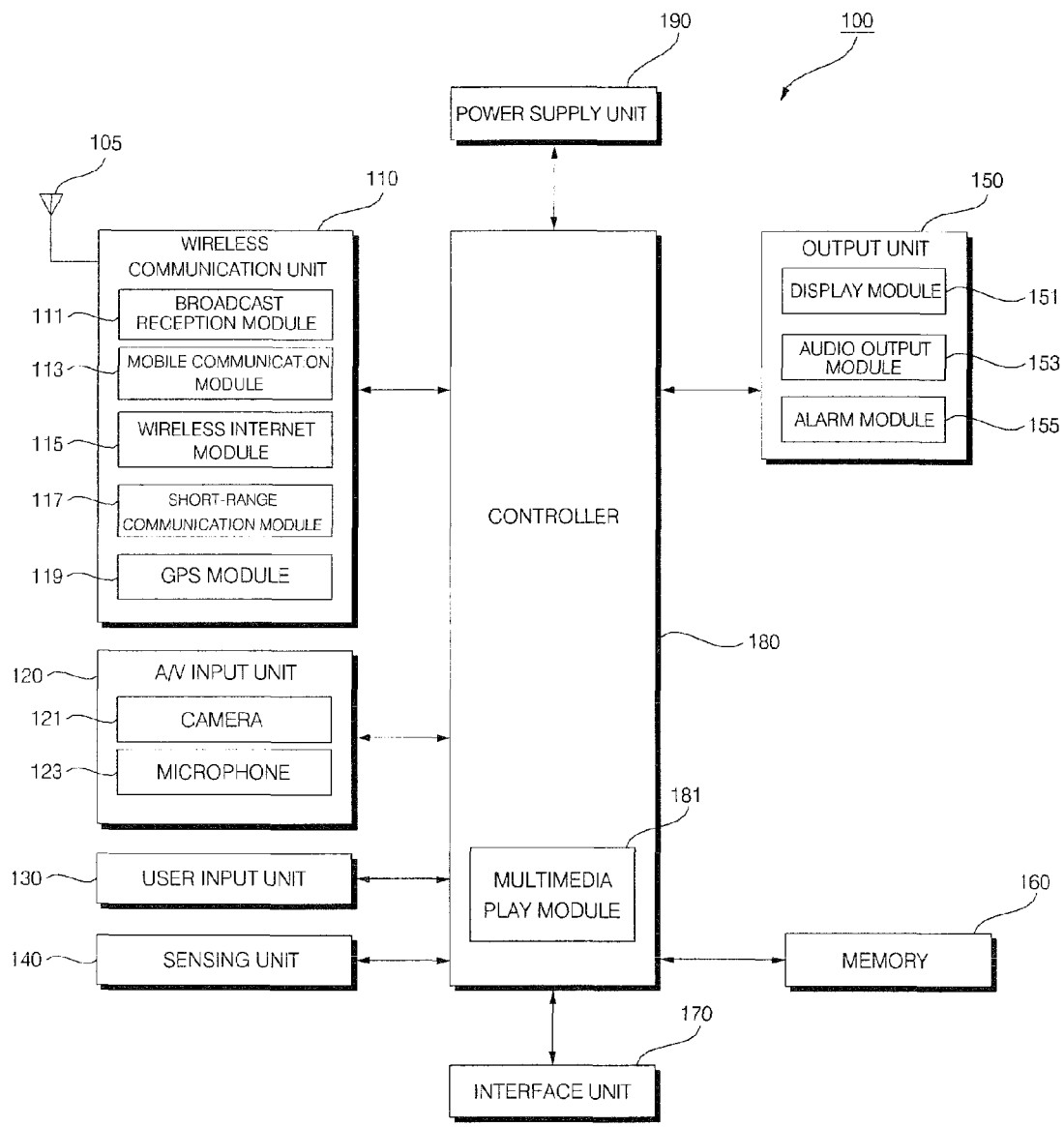
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 1110 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 processes various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted outside the mobile terminal 100 through the wireless communication unit 110. The mobile terminal 100 may include two or more cameras 121.

The microphone 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153, and an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by a user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the control unit 180. Then, the control unit 180 determines whether a touch input has been generated and which part of the touch screen panel has been touched based on the processed signals transmitted by the touch screen panel controller.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output a vibration signal upon receiving a call signal or a message. In addition, the alarm module 155 may receive a key signal and may output a vibration signal as feedback to the key signal. Once a vibration signal is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100.

The mobile terminal 100 may be configured to include a wired/wireless communication system and a satellite communication system and may thus be able to operate in a communication system capable of transmitting data as frames or packets.

Figure 2:
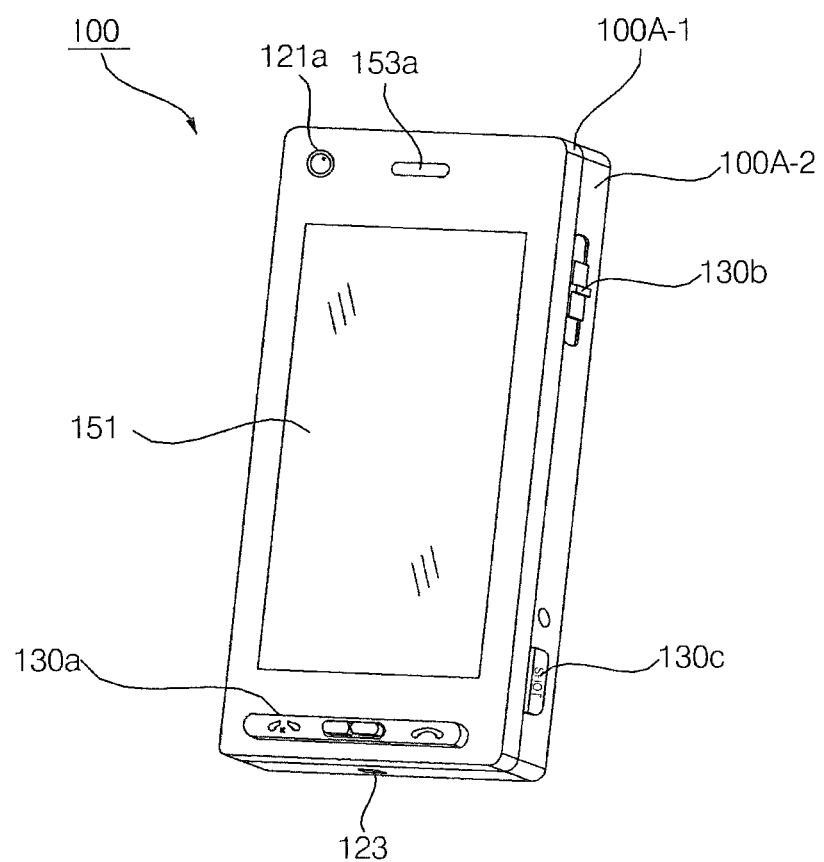
FIG. 2 illustrates a front perspective view of the mobile terminal shown in FIG. 1.

FIG. 2 illustrates a front perspective view of the mobile terminal 100. Referring to FIG. 2, a front case 100A-1 and a rear case 100A-2 may form the exterior of the mobile terminal 100. Various electronic devices may be installed in the empty space between the front case 100A-1 and the rear case 100A-2. At least one middle case (not shown) may be additionally provided between the front case 100A-1 and the rear case 100A-2. The front case 100A-1, the rear case 100A-2 and the middle case may be formed of synthetic resin through injection molding. Alternatively, the front case 100A-1, the rear case 100A-2 and the middle case may be formed of a metal material such as stainless steel (STS) or titanium (Ti).

The display module 151, a first audio output unit 153a, a first camera 121a and a first user input unit 130a may be disposed on the front case 100A-1. Second and third user input units 130b and 130c and the microphone 123 may be disposed on one side surface of the rear case 100A-2.

The display module 151 may include a liquid crystal display (LCD) or an organic light-emitting diode (OLED) and may thus be able to visualize various information. The display module 151 may form a layer structure by being overlaid by a touch pad and may thus serve as a touch screen capable of receiving information in response to a touch input made by the user.

The first audio output unit 153a may be implemented as a receiver or a speaker. The first camera 121a may be configured to be suitable for capturing a still or moving image of the user. The microphone 123 may be configured to be suitable for receiving the voice of the user or other sounds.

The first through third user input units 130a through 130c may be collectively referred to as the user input unit 130. The user input unit 130 may adopt various manipulation methods as long as it can offer tactile feedback to a user. For example, the user input unit 130 may be implemented as a dome switch or a touch pad capable of receiving a command or information in response to a push input or a touch input made by the user. Alternatively, the user input unit 130 may be implemented as a jog wheel or a joystick capable of being rotated by the user. The first user input unit 130*a* may be used to input 'start', 'end' and 'call' commands, the second user input unit 130*b* may be used to choose an operating mode for the mobile terminal 100, and the third user input unit 130*c* may serve as a hot key for activating certain functions of the mobile terminal 100.

Figure 3:
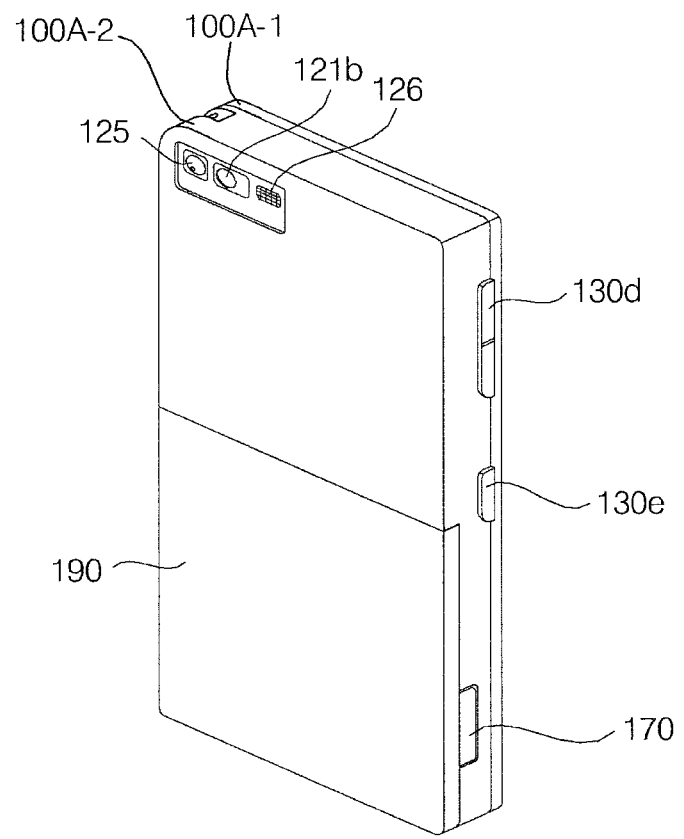
FIG. 3 illustrates a rear perspective view of the mobile terminal shown in FIG. 2.

FIG. 3 illustrates a rear perspective view of the mobile terminal 100. Referring to FIG. 3, a fourth user input unit 130*d*, a fifth user input unit 130*e* and the interface unit 170 may be disposed on one side surface of the rear case 100A-2, and a second camera 121*b* may be disposed at the rear of the rear case 100A-2.

The second camera 121*b* may have a different photographing direction from that of the first camera 121*a* shown in FIG. 2. In addition, the pixel quantity of the second camera 121*b* may be different from the pixel quantity of the first camera 121*a*. For example, the first camera 121*a* may be used to capture an image of the user's face and then readily transmit the captured image during a video call. Thus, a camera having a low pixel count may be used as the first camera 121*a*. The second camera 121*b* may be used to capture an image of an ordinary subject. Given that images captured by the second camera 121*b* generally do not need to be transmitted, a camera having a high pixel count may be used as the second camera 121*b*.

A mirror 125 and a camera flash 126 may be disposed near the second camera 121*b*. The user may look in the mirror 125 for taking a self shot using the second camera 121*b*. The camera flash 126 may illuminate a subject when the second camera 121*b* captures an image of the subject.

A second audio output module (not shown) may be additionally provided on the rear case 100A-2. The second audio output module may realize a stereo function along with the first audio output module 153*a*. The second audio output module may also be used during a speaker-phone mode.

An antenna (not shown) for receiving a broadcast signal may be disposed on one side surface of the rear case 100A-2. The antenna may be installed so as to be able to be ejected from the rear case 100A-2.

The interface unit 170 may serve as a path for allowing the mobile terminal 100 to exchange data with an external device.

The power supply unit 190 may be disposed in the rear case 100A-2. The power supply unit 190, for example, a rechargeable battery, may be coupled to the rear case 100A-2 so as to be able to be attached to or detached from the rear case 100A-2.

The second camera 121*b* is illustrated in FIG. 3 as being disposed on the rear case 100A-2, but the present invention is not restricted to this. The second camera 121*b* may be optional, if the first camera 121*a* can rotate and can thus cover the photographing direction of the second camera 121*b*.

Figure 4:
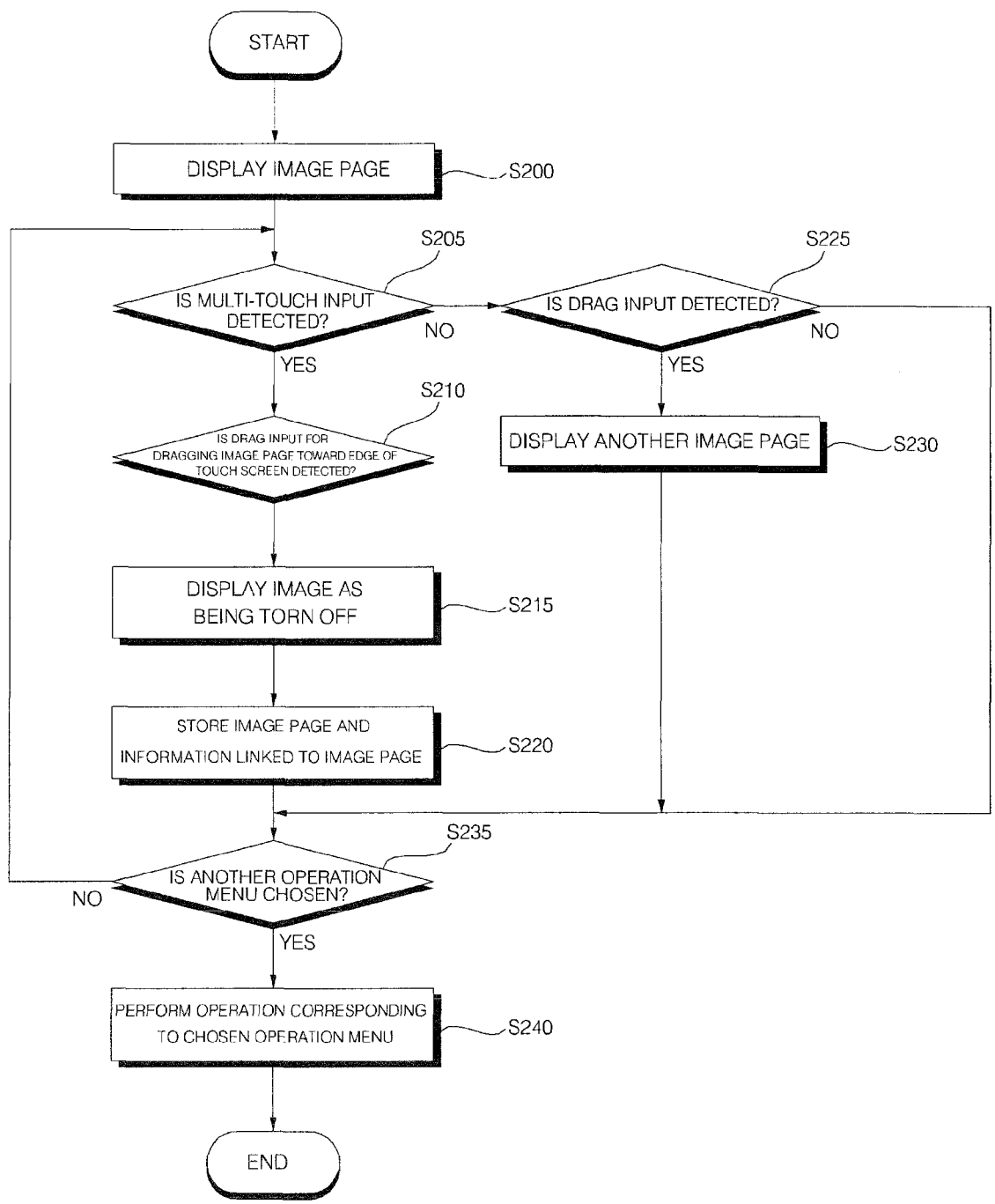
FIG. 4 illustrates a flowchart of a method of controlling the operation of a mobile terminal according to an exemplary embodiment of the present invention.
Figure 5:
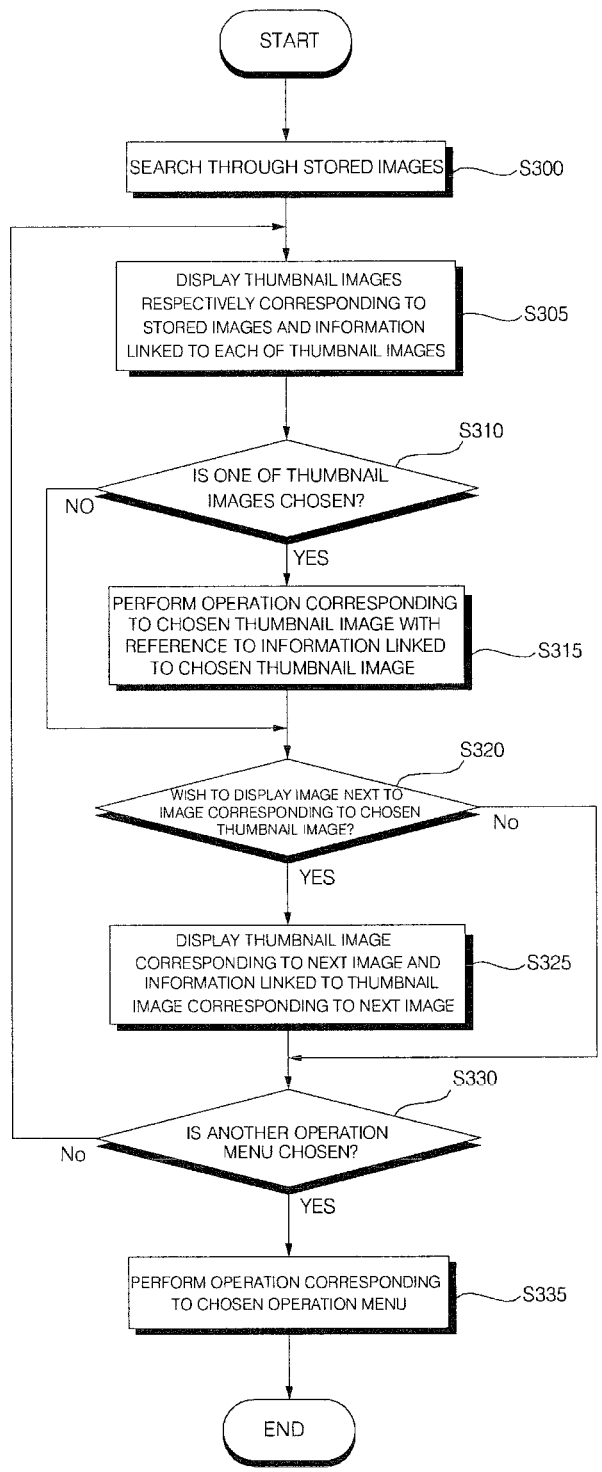
FIG. 5 illustrates a flowchart of a method of controlling the operation of a mobile terminal according to another exemplary embodiment of the present invention.

FIG. 4 illustrates a flowchart of a method of controlling the operation of a mobile terminal according to an exemplary embodiment of the present invention, and FIG. 5 illustrates a flowchart of a method of controlling the operation of a mobile terminal according to another exemplary embodiment of the present invention.

Referring to FIG. 4, if a menu involving the display of one or more images such as a webpage access menu, an e-book view menu or a photo album menu is chosen, the controller 180 may display an image page including a plurality of images corresponding to the chosen menu on the display module 151 (S200).

Thereafter, the controller 180 may determine whether a touch input has been detected from the image page and whether the touch input is a multi-touch input (S205). A multi-touch input may be generated by touching more than region on a touch screen at the same time with a user's fingers or palms. More specifically, the controller 180 may determine whether a touch input has been detected from the image page, whether the touch input is a multi-touch input indicating that more than one part of the input screen has been touched at the same time and what part(s) of the input screen has been touched based on a signal provided by the display module 151.

If the touch input is determined to be a multi-touch input (S205) and a drag input for dragging the image page toward an edge of the display module 151 is detected after the detection of the multi-touch input (S210), the controller 180 may display the image page as being torn off, like a page of a book (S215). Thereafter, the controller 180 may store data corresponding to the image page and information linked to the image page in the memory 160 (S220). The information linked to the image screen may include information regarding each of the images included in the image page such as image save time information indicating when each of the images included in the image page was saved, and a phone number and a webpage address linked to each of the images included in the image page.

If the touch input is determined to not be a multi-touch input and a drag input is detected after the detection of the touch input (S225), the controller 180 may control another image page to be displayed on the display module 151 (S230). The image page displayed in operation S230 may be a web page or an image page next to the image page displayed in operation S200. It may be determined in advance what image page is to be displayed in response to a touch-and-drag input based on one of a touch input, a key input and a user input detected by a proximity sensor.

If the user chooses another operation menu (S235), the controller 180 may control an operation corresponding to the operation menu chosen in operation S235 to be performed (S240). On the other hand, if the user does not choose any other operation menu, the method returns to operation S205.

In the exemplary embodiment of FIG. 4, if a multi-touch input and then a drag input are detected from a touch screen, an image displayed on the touch screen may be stored after being displayed as being torn from one side of the touch screen. However, the present invention is not restricted to this. That is, if the user touches an image displayed on a touch screen with his/her palm and then moves his/her palm over the touch screen, the image displayed on the touch screen may be stored after being displayed as being torn from one side of the touch screen. That is, if a touch input which is touched by a larger part of a touch screen than a reference area is detected and then a drag input is detected, an image displayed on the touch screen may be displayed as being torn from one side of the touch screen. Then, the image may be stored along with information linked thereto.

FIG. 5 illustrates a flowchart of a method of controlling the operation of a mobile terminal according to another exemplary embodiment of the present invention. Referring to FIG. 5, if a menu for searching through images present in the memory 160 is chosen in response to a user command, the controller 180 may control an image page including a plurality of thumbnail images respectively corresponding to the images present in the memory 160 and information linked to each of the thumbnail images to be displayed on the display module 151 (S305).

If one of the thumbnail images is chosen in response to a user command (S310), the controller 180 may control an operation corresponding to the chosen thumbnail image to be performed with reference to information linked to a corresponding chosen thumbnail image (S315). Examples of the operation performed in operation S315 include connecting a call to a phone number linked to the chosen thumbnail image, accessing a webpage corresponding to a webpage address linked to the chosen thumbnail image and displaying an image corresponding to the chosen thumbnail image on the entire screen of the display module 151.

If the user wishes to display an image next to the image corresponding to the chosen thumbnail image (S320), the controller 180 may control a thumbnail image corresponding to the next image and information linked to the thumbnail image corresponding to the next image to be displayed on the display module 151 (S325).

If another operation menu is chosen (S330), the controller 180 may control an operation corresponding to the chosen operation menu to be performed (S335). On the other hand, if no other operation menu is chosen, the method returns to operation S310.

In this manner, it is possible to easily store an image displayed on the display module 151 in response to a multi-touch input and perform various operations such as making a call, sending a message or accessing a webpage by using information linked to an image stored in response to a multi-touch input.

Figure 6:
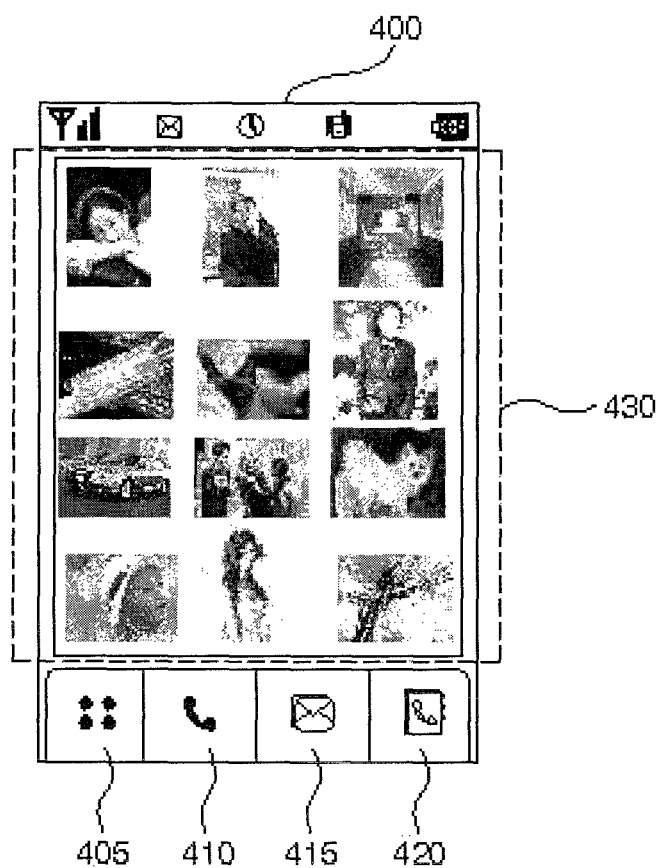
FIGS. 6 through 8 illustrate diagrams for explaining the method shown in FIG. 4.
Figure 7:
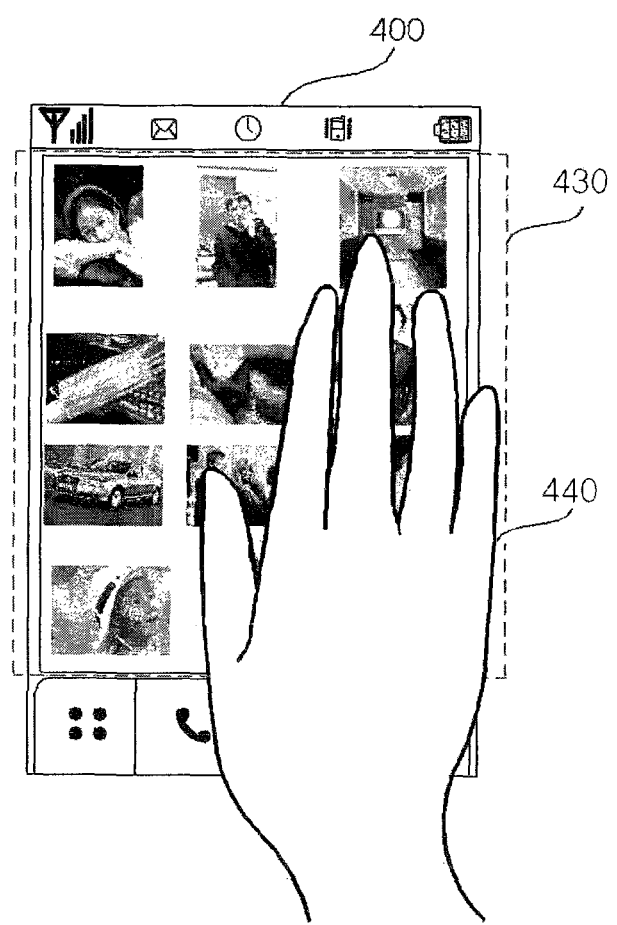
Figure 8:
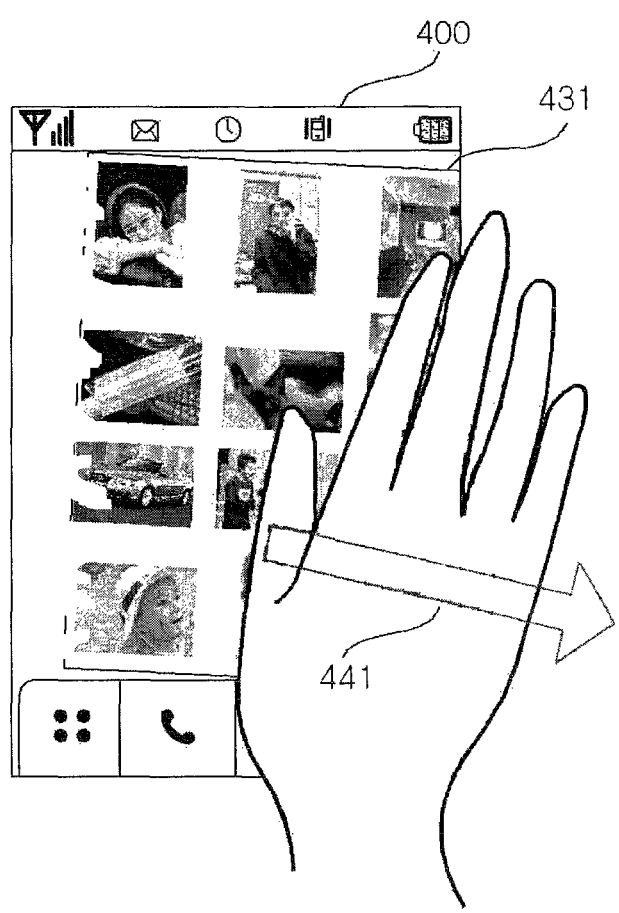

FIGS. 6 through 8 illustrate diagrams for explaining the method shown in FIG. 4.

Referring to FIG. 6, a plurality of indicator icons may be displayed at the top of a screen 400 of the display module 151, an image page 430 including a plurality of images may be displayed in the middle of the screen 400, and an icon 405 for choosing a menu other than the menu currently being executed, an icon 410 for making a call, an icon 415 for choosing a message menu, and an icon 420 for choosing a phonebook menu may be displayed at the bottom of the screen 400.

The image page 430 may be displayed when accessing a website, viewing an e-book or displaying a photo album.

Referring to FIG. 7, if a user touches the image page 430 with his/her hand 440, it may be determined that a multi-touch input is generated by the user. It may also be determined that a multi-touch input is generated if the user touches more than one part of the image page 430 with his/her fingers. A multi-touch input may indicate that more than one region on the image page 430 is touched at the same time by the user and may thus be differentiated from a typical touch input generated by touching only one region on the image page 430 with a finger.

A touch input by which a larger part of the image page 430 than a reference area is touched may be treated in the same manner as a multi-touch input.

Referring to FIG. 8, if a drag input for dragging the image page 430 toward an edge of the screen 400, as indicated by reference numeral 441, is detected after the detection of a multi-touch input, the image page 430 may be displayed on the screen 400 as being torn off, as indicated by reference numeral 431.

Then, the images included in the image page 430 and information linked to each of the images included in the image page 430 may be stored. The information linked to each of the images included in the image page 430 may include image save time information indicating when each of the images included in the image page 430 was saved, and a phone number and a webpage address linked to each of the images included in the image page 430. If a typical touch input is detected from the image page 430 and then a drag input for dragging the image page 430 toward an edge of the screen 400 is detected, another image page may be displayed on the screen 400.

Figure 9:
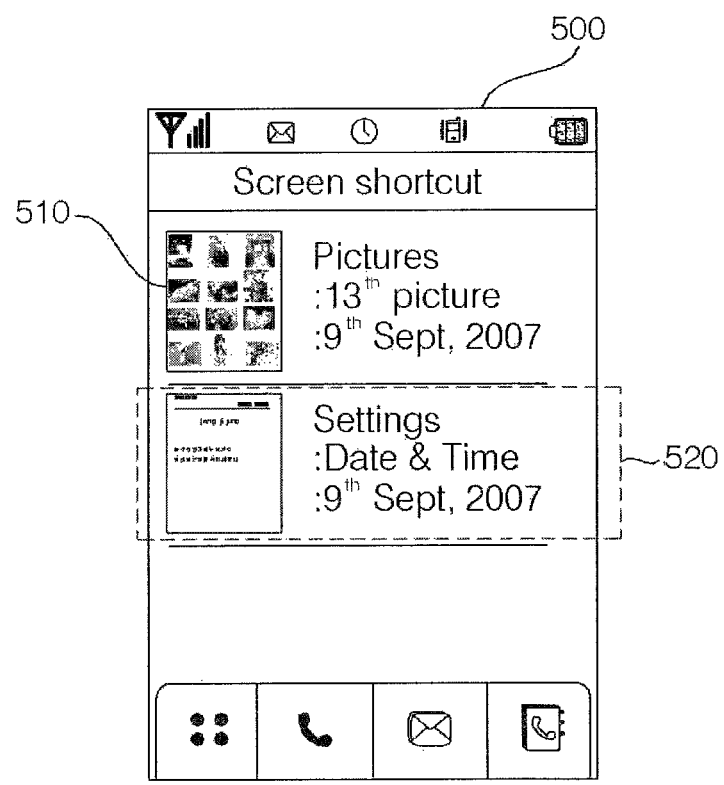
FIG. 9 illustrates a diagram for explaining the method shown in FIG. 5.

FIG. 9 illustrates a diagram for explaining the method shown in FIG. 5. Referring to FIG. 9, a thumbnail image 510 corresponding to an image or an image page present in the memory 160 and information 520 linked to the thumbnail image 510 may be displayed on a screen 500. If one or more pieces of information 520 are linked to the thumbnail image 510, they may be sequentially displayed in response to a user input, or may all be displayed at the same time. If the thumbnail image 510 is chosen in response to a user input, one or more images corresponding to the thumbnail image 510 may be displayed on the entire screen 500. Alternatively, various operations such as making a call, sending a message or accessing a web page may be performed with reference to the information 520 or information linked to the thumbnail image 510.

In this manner, it is possible to easily store for later use various information regarding an image displayed on the display module 151 in response to a multi-touch input and to improve the usability of the various information.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to easily store an image displayed on a touch screen along with various information regarding the image in response to a multi-touch input to the touch screen and to improve the usability of the various information. Therefore, it is possible to efficiently control the operation of even a mobile terminal equipped with a small touch screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling operation of a mobile terminal, the method comprising:
   displaying a first image page on a touch screen, wherein the image page includes a plurality of images;
   when a multi-touch input is detected from the first image page and then a drag input for dragging the multi-touched first image page toward an edge of the touch screen is detected, displaying the first image page as being torn from one side of the touch screen and then being moved according to a direction of the drag input, and storing the first image page and information linked to the first image page and to each of the images included in the first image page, in a memory of the mobile terminal;

storing a plurality of image pages in the memory of the mobile terminal;

when the plurality of image pages stored in the memory are searched, displaying a plurality of thumbnail images respectively corresponding to the image pages and information linked to each of the stored image pages, and displaying a plurality of thumbnail images respectively corresponding to each of the images included in the image page and information linked thereto; and when one of the thumbnail images corresponding to an image included in the image page is chosen, performing at least one of making a call, sending a message and accessing a webpage based on information linked to the chosen thumbnail image.

2. The method of claim 1, wherein the information linked to the first image page includes information regarding the first image page, phone number information and webpage address information.

3. The method of claim 1, further comprising when one of the thumbnail images is chosen, displaying an image corresponding the chosen thumbnail on the entire touch screen.

4. The method of claim 1, further comprising when a touch input is detected from the first image page and then a drag input for dragging the first image page is detected, displaying a second image page on the touch screen.

5. The method of claim 4, further comprising setting the second image page based on one of a touch input, a key input and a user input detected by a proximity sensor.

6. The method of claim 1, wherein the displaying of the first image page includes displaying the first image page when one of a webpage access menu, an e-book menu and a photo album menu is executed.

7. The method of claim 1, further comprising:
displaying one or more operation menu region on the touch screen; and
when a touch input is detected from at least one of the operation menu regions, performing an operation corresponding to the operation menu region(s) from which the touch input is detected.

8. A mobile terminal comprising:
a touch screen configured to display a first image page, wherein the image page includes a plurality of images;
a memory configured to store data; and
a controller configured to display the first image page as being torn from one side of the touch screen and then being moved according to a direction of a drag input, and configured to store the first image page and information linked to the first image page and to each of the images included in the first image page in the memory, when a multi-touch input is detected from the first image page and then the drag input for dragging the multi-touched first image page toward an edge of the touch screen is detected,
storing a plurality of image pages in the memory;
wherein when the plurality of image pages stored in the memory are searched, the controller controls the touch screen to display a plurality of thumbnail images respectively corresponding to the stored image pages and information linked to each of the stored image pages, and to display a plurality of thumbnail images respectively corresponding to each of the images included in the image page and information linked thereto;

and wherein when one of the thumbnail images corresponding to an image included in the image page is chosen, the controller performs at least one of making a call, sending a message and accessing a webpage based on information linked to the chosen thumbnail image.

9. The mobile terminal of claim 8, further comprising a wireless communication unit configured to communicate through a mobile communication network.

10. A method of controlling operation of a mobile terminal, the method comprising:
displaying an image page on a touch screen, wherein the image page includes a plurality of images;
when a touch input that is touched by a larger part of the image page than a reference area is detected and then a drag input for dragging the touched image page toward an edge of the touch screen is detected, displaying the image page as being torn from one side of the touch screen and then being moved according to a direction of the drag input, and storing the image page and information linked to the image page and to each of the images included in the image page in a memory of the mobile terminal;
storing a plurality of image pages in the memory;
when the plurality, of image pages stored in the memory are searched, displaying a plurality of thumbnail images respectively corresponding to the stored image pages and information linked to each of the stored image page, and displaying a plurality of thumbnail images respectively corresponding to each of the images included in the image page and information linked thereto;
and when one of the thumbnail images corresponding to an image included in the image page is chosen, performing at least one of making a call, sending a message and accessing a webpage based on information linked to the chosen thumbnail image.

11. A mobile terminal comprising:
a touch screen configured to display an image page, wherein the image page includes a plurality of images;
a memory, configured to store data;
and a controller configured to display the image page as being torn from one side of the touch screen and then being moved according to a direction of a drag inputs and configured to store the image page and information linked to the image page and to each of the images included in the image page, when a touch input that is touched by a larger part of the image page than a reference area is detected and then the drag input for dragging the touched image page toward an edge of the touch screen is detected,
storing a plurality of image pages in the memory;
wherein when the plurality of image pages stored in the memory are searched, the controller controls the touch screen to display a plurality of thumbnail images respectively corresponding to the stored image pages and information linked to each of the stored image pages, and
wherein when one of the thumbnail images corresponding to an image included in the image page is chosen, the controller performs at least one of making a call, sending a message and accessing a webpage based on information linked to the chosen thumbnail image.

* * * * *